United States Patent Office 3,274,975
Patented Sept. 27, 1966

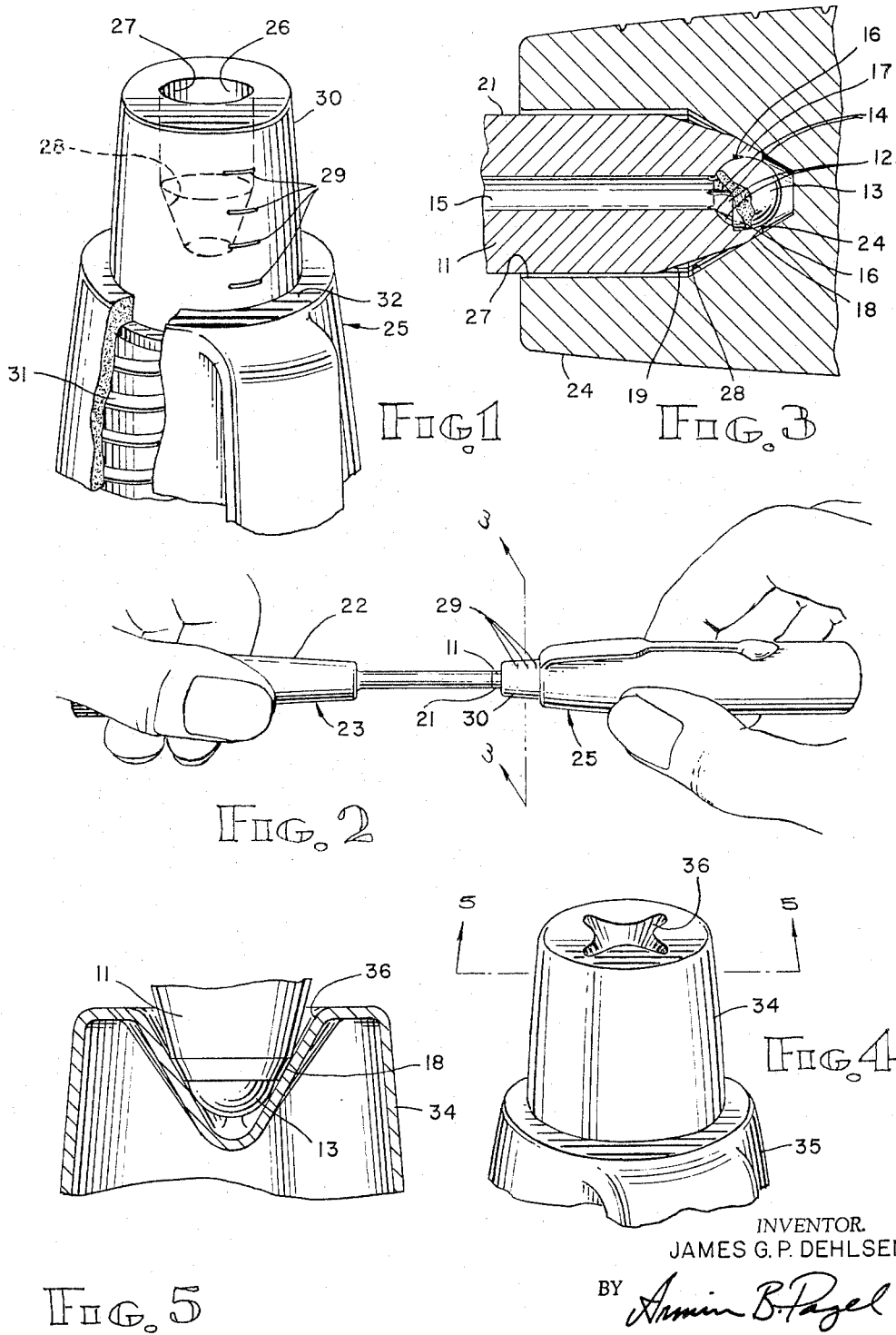

3,274,975
BALL POINT PEN INCORPORATING A POINT RECONDITIONING DEVICE
James G. P. Dehlsen, South Pasadena, Calif., assignor to The Parker Pen Company, Janesville, Wis., a corporation of Wisconsin
Filed Nov. 9, 1964, Ser. No. 409,887
1 Claim. (Cl. 120—1)

The present invention relates to ball point pens and particularly to a ball point pen incorporating a point reconditioning device adapted to facilitate altering the clearance between the writing ball and the socket within which the ball is housed to improve the writing characteristics of the pen.

In conventional ball point pens, the writing ball of the writing unit is rotatably supported in a socket comprising a central ink feed duct and rearwardly disposed spherical ball seating surfaces, and is retained in the socket by an annular lip located ahead of the center of the ball and slightly smaller in internal diameter than the diameter of the ball. In addition to retaining the ball in the socket, this lip also serves, by reason of its close proximity to the ball surface, to control the thickness of the film of ink on the external portion of the ball as the pen is used. Thus, if the clearance between the ball and the annular rim is not sufficient, the pen will produce an undesirably light line, while, on the other hand, excessive clearance between the lip and the ball will result in an undesirably dense and wet line and in "gooping" caused by the collection of drops of excess ink on the point, which are carried by the ball onto the paper.

Although a ball point pen having proper clearance between the lip and the writing ball may initially perform satisfactorily, continued usage, particularly if the pen is held at a rather acute angle, causes the ball and/or the internal surface of the lip to wear sufficiently to produce excess clearance, resulting in the above-mentioned undesirable writing characteristics. Accordingly, the principal object of the present invention is to provide a simple device by means of which the clearance between the annular retaining lip and the writing ball of a ball point pen may be decreased to reduce the flow of ink in a pen in which such clearance, and hence the rate of ink flow, is excessive, as a result either of its initial fabrication or subsequent wear.

Another object of the present invention is to provide such a device which is inexpensive and simple to use and which comprises an integral part of a ball point pen suitable for use with the particular type of writing unit employed therein.

Yet another object of the invention is to provide such a device with means for insuring proper alignment thereof with the socket portion of the ball point writing unit as the device is utilized to alter the clearance between the ball and the annular lip.

These and other important objects of the invention will be apparent by reference to the following detailed description and the accompanying drawings in which:

FIG. 1 is an enlarged perspective partial view of the top end portion of a retractable ball point pen incorporating a device according to a preferred embodiment of the invention in the push button of the pen;

FIG. 2 is a partial perspective view, illustrating the manner in which the device shown in FIG. 1 is used to reduce the ink flow of a ball point writing unit;

FIG. 3 is an enlarged elevational view, partly in cross section, taken along the lines 3—3 of FIG. 2 showing the internal construction of the device and of the writing tip of a conventional ball point writing unit;

FIG. 4 is an enlarged perspective partial view of the top portion of a ball point pen showing another embodiment of the invention incorporated in the cap member of the pen; and FIG. 5 is an enlarged cross sectional elevational view taken along the lines 5—5 of FIG. 4 showing the tip of a conventional ball point writing unit inserted into the point conditioning device shown in FIG. 4.

Referring now to the drawings, and particularly to FIG. 3, the writing tip of a conventional ball point writing instrument comprises a tubular member 11 including a plurality of spherical ball seating surfaces 12 adjacent the rearward surface of the writing ball 13, a plurality of ink ducts 14 extending between a central ink channel 15 and an annular space 16 ahead of the ball seating surfaces 12, and a continuous annular lip 17 ahead of the center of the ball and in such close proximity to the ball as to retain it in the socket. In external configuration, the forward portion of the tubular member 11 comprises a conical area 18 formed by a swaging or spinning tool used to deform the annular lip into close proximity with the ball during the fabrication of the unit, the internal angle of the imaginary cone defined by this surface being referred to as the spin angle. Behind the conical area 18, the tubular member may be provided with a second conical area 19 between area 18 and the cylindrical portion 21, which is mounted to the ink reservoir portion 22 of the writing unit 23. Alternatively, the forward portion of the tubular member adjacent area 18 may be cylindrical but of smaller diameter than the illustrated cylindrical portion 21.

As previously mentioned, the clearance between the annular lip and the surface of the writing ball in the area designated by the numeral 24 determines the thickness of the film of ink over the portion of the ball surface extending beyond the lip as the ball rotates during writing, and hence the quality of the written line produced by the unit. Thus, if this clearance is excessive, either initially, or as a result of wear, the lip must be resized to achieve the proper clearance to produce a satisfactory written line.

To enable this operation to be readily performed by an unskilled person by means of a simple and inexpensive tool appropriate for use with a particular type of writing unit, the present invention incorporates as an integral part of a ball pen housing a reconditioning device adapted to service the particular type of writing unit supplied with the pen. In the preferred embodiment shown in FIGS. 1, 2 and 3, the reconditioning device is formed as an integral part of the pushbutton 30, which is axially movable relative to the pen housing 25 against the influence of spring 31, but which is prevented from rotating relative to the housing by means not shown in the drawing. The device comprises a cavity 26 defining a cylindrical internal wall section 27 and a frusto conical tapered wall section 28, corresponding in angular configuration to the spin angle of the writing unit employed in the pen.

To reduce the rate of ink flow in the writing unit, the writing unit is removed from the pen and inserted into cavity 26 as shown in FIGS. 2 and 3 thereby bringing the lip area 18 into engagement with the tapered inner wall surface 28. In this position the writing unit is pressed toward the pen housing and simultaneously rotated, either unidirectionally or back and forth, thereby constricting the annular lip as the tip is pressed and rotated against surface 28, which is formed of a material having a greater hardness than the material of tubular member 11. The cylindrical inner surface 27 is of slightly larger diameter than the cylindrical portion 21 of the writing tip, to assist in maintaining the tip and the reconditioning device in coaxial alignment so that the tapered surface 28 bears uniformly against lip 18 without contacting the writing ball.

If excessive pressure is applied during the use of the subject device to recondition a writing unit, it is possible to constrict the lip to such an extent as to reduce the flow of ink beyond an acceptable point or even to cause the lip to enagage the ball and prevent its rotation in the socket. Accordingly, the proper procedure is to use the device as previously described with only moderate pressure, to test the result by writing with the unit, and to repeat the same operations using progressively increasing pressure until a satisfactory line is produced. To facilitate this procedure, the device shown in FIGS. 1, 2 and 3 includes axially spaced indicia 29 on the outer surface of the pushbutton 30 to indicate the amount of force being applied, which is proportional to the depression of the push button against the resilient force of internal spring 31 urging the push button toward its projected position. In using these indicia, the initial trial is made using only enough pressure to depress the button until the lowermost mark is even with the top edge 32 of housing 25, whereafter, if further treatment is indicated, each successive trial is made using sufficiently greater pressure to depress the button to its next higher mark.

FIGS. 4 and 5 illustrate an alternate embodiment of the invention in which the point reconditioning recesses comprise a tapered polygonal or star shaped indentation formed in a hollow member 34 rigidly attached to the cap member 35 of a ball point pen. In such an embodiment, the internal surfaces 36 of the recess, which engage the forward conical portion of the writing tip, are angularly disposed at the same angle as the spin angle of the particular tip employed in the pen and provide a relatively small area of contact to increase the unit pressure exerted on the lip portion of the tip during the resizing operation. Such an increase in the unit pressure is particularly desirable if it is desired to use such a device to recondition a writing tip formed of a relatively hard material such as stainless steel.

Although the embodiment shown in FIGS. 4 and 5 is illustrated in conjunction with a hallow cap member and does not incorporate an integral guide surface as shown at 27, it is obvious that the polygonal configuration could be embodied in the specific design shown in FIGS. 1 through 3 and that either illustrated embodiment or an embodiment combining features of both could be incorporated either in a hollow or solid pushbutton or cap member. Since these and other modifications are included within the spirit of the invention, the foregoing explanation is to be considered as illustrative and not as limiting in scope of the invention as defined by the following claim.

I claim:

A ball point writing instrument comprising a tubular outer barrel open at its forward end, a writing unit with a writing tip comprising a socket member provided with a writing ball rotatably retained therein by an annular forward lip portion of said socket closely spaced from said ball ahead of the center of said ball and of tapered external configuration, said writing unit being removably housed within said barrel for movement between a projected position in which said writing tip projects through the open end of said barrel and a retracted position in which said writing tip is withdrawn into said barrel, an axially reciprocable pushbutton restrained against rotation relative to the barrel and projecting rearwardly from the rearward end of said barrel, resilient means urging said pushbutton in a rearward direction, and a device for reducing the clearance between said lip and said ball, said device comprising wall means forming a rearwardly opening recess in the rearward end of said pushbutton adapted to receive the writing tip of said unit when said unit is removed from said barrel, said wall means being of greater hardness than the socket member of said tip and defining a plurality of surface areas immovable relative to one another adapted simultaneously to engage the forward lip portion of said tip along lines corresponding substantially to the generatrix of said exterior forward portion of said tip at spaced intervals about the periphery thereof whereby the rotative insertion of said tip into said recess under axial force acting against said resilient means causes said forward lip portion to be constricted by the surface areas of said wall means of the device.

References Cited by the Examiner

UNITED STATES PATENTS

| | | | |
|---|---|---|---|
| 1,590,330 | 6/1926 | Stevenson | 120—92 |
| 2,270,107 | 1/1942 | Cadot | 120—92 |
| 2,891,511 | 6/1959 | Fehling | 120—42.4 |
| 2,970,558 | 2/1961 | Albertini | 120—42.4 X |
| 3,000,090 | 9/1961 | Fehling | 120—42.4 X |
| 3,009,240 | 11/1961 | Brown | 120—42.4 X |
| 3,043,387 | 7/1962 | Nachsi | 120—1 X |

LAWRENCE CHARLES, *Primary Examiner.*